United States Patent
Kindvall et al.

(10) Patent No.: US 10,736,350 B2
(45) Date of Patent: Aug. 11, 2020

(54) METHOD FOR PRODUCING A POUCHED SMOKELESS TOBACCO PRODUCT COMPRISING HEAT TREATMENT

(71) Applicant: Swedish Match North Europe AB, Stockholm (SE)

(72) Inventors: Mårten Kindvall, Göteborg (SE); Hans Eriksson, Göteborg (SE)

(73) Assignee: Swedish Match North Europe AB, Stockholm (SE)

( * ) Notice: Subject to any disclaimer, the term of this patent is extended or adjusted under 35 U.S.C. 154(b) by 85 days.

(21) Appl. No.: 15/557,750

(22) PCT Filed: Apr. 7, 2016

(86) PCT No.: PCT/EP2016/057618
§ 371 (c)(1),
(2) Date: Sep. 12, 2017

(87) PCT Pub. No.: WO2016/162420
PCT Pub. Date: Oct. 13, 2016

(65) Prior Publication Data
US 2018/0064159 A1    Mar. 8, 2018

(30) Foreign Application Priority Data

Apr. 8, 2015   (EP) .................................. 15162774

(51) Int. Cl.
*A24B 15/18* (2006.01)
*A24B 13/00* (2006.01)

(52) U.S. Cl.
CPC ............ *A24B 15/183* (2013.01); *A24B 13/00* (2013.01); *A24B 15/18* (2013.01)

(58) Field of Classification Search
None
See application file for complete search history.

(56) References Cited

U.S. PATENT DOCUMENTS

| | | | |
|---|---|---|---|
| 4,703,765 A | 11/1987 | Paules et al. | |
| 6,135,120 A | 10/2000 | Lofman et al. | |
| 6,135,121 A * | 10/2000 | Williams | A23G 4/068 131/290 |
| 8,807,141 B2 | 8/2014 | Breslin et al. | |
| 2007/0062549 A1* | 3/2007 | Holton, Jr. | A24B 13/00 131/352 |
| 2008/0029110 A1 | 2/2008 | Dube | |
| 2010/0218779 A1 | 9/2010 | Zhuang et al. | |
| 2011/0247640 A1* | 10/2011 | Beeson | A24B 15/18 131/275 |
| 2013/0008458 A1* | 1/2013 | Okada | A24B 15/287 131/352 |
| 2013/0118512 A1* | 5/2013 | Jackson | A24B 15/30 131/355 |

FOREIGN PATENT DOCUMENTS

| | | |
|---|---|---|
| EP | 2179666 | 4/2010 |
| EP | 2428450 | 3/2012 |
| EP | 2443943 | 4/2012 |
| EP | 2818058 | 12/2014 |
| EP | 2818059 | 12/2014 |

OTHER PUBLICATIONS

Federal Register/vol. 74, No. 4/712-719/Wednesday, Jan. 7, 2009/ Notices, "Total moisture determination.".
AOAC (Association of Official Analytical Chemics), Official Methods of Analysis 966.02: "Moisture in Tobacco" (1990), Fifteenth Edition, K. Helrich (ed).
European Search Report for Application No. EP 15 16 2774 dated Sep. 15, 2015.
International Search Report for International Application No. PCT/EP2016/057618 dated Jun. 9, 2016.

* cited by examiner

*Primary Examiner* — Cynthia Szewczyk
(74) *Attorney, Agent, or Firm* — Knobbe Martens Olson & Bear LLP

(57) ABSTRACT

The invention relates to a method for producing pouched smokeless tobacco products for oral use as well as to a pouched smokeless tobacco product obtainable using this method. The method comprises heat-treating an initial tobacco preparation having water content below 20% w/w, providing a smokeless tobacco composition comprising the heat-treated tobacco preparation and enclosing portions of said smokeless tobacco composition in saliva-permeable pouch material.

12 Claims, 4 Drawing Sheets

METHOD FOR PRODUCING A POUCHED SMOKELESS TOBACCO PRODUCT COMPRISING HEAT TREATMENT

CROSS REFERENCE TO RELATED APPLICATIONS

This application is a U.S. National Phase Application of PCT International Application Number PCT/EP2016/057618, filed on Apr. 7, 2016, designating the United States of America and published in the English language, which is an International Application of and claims the benefit of priority to European Patent Application No. 15162774.2, filed on Apr. 8, 2015. The disclosures of the above-referenced applications are hereby expressly incorporated by reference in their entireties.

TECHNICAL FIELD

The present invention relates to a method for producing pouched smokeless tobacco products.

BACKGROUND

Smokeless tobacco for oral use includes chewing tobacco, dry snuff and moist (wet) snuff. Generally, dry snuff has moisture content of less than 10 wt % and moist snuff has a moisture content of above 40 wt %. Semi-dry products having between 10% to 40 wt % moisture content are also available.

Smokeless tobacco products for oral use are made from tobacco leaves, such as lamina and stem of the tobacco leaf. The material from roots and stalks are normally not utilized for production of smokeless tobacco compositions for oral use.

There are two types of moist snuff, the American type and the Scandinavian type which is also called snus. American-type moist snuff is commonly produced through a fermentation process of moisturized ground or cut tobacco. Scandinavian-type moist snuff (snus) is commonly produced by using a heat-treatment process (pasteurization). The heat-treatment is carried out in order to degrade, destroy or denature at least a portion of the microorganisms within the tobacco preparation. In production processes typically used today for producing pouched snus products, the tobacco preparation subjected to this heat-treatment process normally has water content within the range of from about 22 to 44% w/w. Generally, additional water, salt, pH adjuster and additional ingredients, such as flavours, are added to the tobacco preparation after this heat-treatment in order to provide the final smokeless tobacco composition, such as the moist snuff.

It is from U.S. Pat. No. 8,807,141 known to alter the organoleptic properties, such as odor, aroma, fragrance, flavour, taste or the like, of smokeless tobacco and/or snuff compositions in a preconditioning process using steam alone and/or using a heated mechanical pressure conditioning process.

EP 2179666 refers to so-called toasting of tobacco material in order to favourably alter the sensory characteristics of the resulting product. A typical toasting process, which is said to occur either before or after the heat treatment process, comprises heating a relatively dry tobacco material, for instance having a moisture content of about 5% to about 20% by weight, at an elevated temperature of about 85° C. to about 300° C. for a time period of about 1 to about 3 hours.

EP 2818058 refers to a method for producing an oral tobacco material, which method comprises adding an acidic substance to a dry oral tobacco material having a pH of more than 8 to lower the pH to 8 or less, and heating the acidic substance-added tobacco material at a temperature of 80° C. or higher.

EP 2818059 refers to a method for producing an oral tobacco material, which method comprises adding an antioxidant to a dry oral tobacco material having a pH of 8 or less, and heating the antioxidant-added tobacco material at a temperature of 80° C. or higher.

Example 1 in US 2008/029110 discloses initial heating a tobacco preparation, having a moisture content of 11.43% by weight, to 65° C. When this temperature has been reached, sodium chloride, water and casing are added and the preparation is mixed. Pasteurization of the tobacco preparation having moisture of 35.95% is thereafter performed at a temperature of least 93° C. and for at least 60 minutes.

Both the American-type and the Scandinavian-type of moist snuff for oral use are available in loose form or portion-packed in a saliva-permeable, porous wrapper material forming a pouch. Pouched moist snuff, including snus, is typically used by the user by placing the pouch between the upper or lower gum and the lip or cheek and retaining it there for a limited period of time. The pouch material holds the tobacco in place while allowing saliva to pass into the tobacco and allowing flavours and nicotine to diffuse from the tobacco material into the user's mouth.

The pouch material is typically a nonwoven fleece (soft fabric) material, such as viscose (regenerated cellulose; viscose fibres are often referred to as viscose rayon or rayon), including an acrylic polymer that acts as binder in the nonwoven material and provides for heat-sealing of the pouches during manufacturing thereof. The viscose nonwoven material normally used for pouched smokeless tobacco products is similar to the fabric used in tea bags. Nonwovens are fabrics that are neither woven nor knitted. Methods for the manufacturing of nonwoven materials are commonly known in the art.

Pouched smokeless tobacco products for oral use may be post-moisturized after pouch formation or not post-moisturized after pouch formation, which herein is referred to as non-post-moisturized. Post-moisturized pouched products may be produced by spraying water on the pouched smokeless tobacco product before packaging the pouched products in cans. Post-moisturized pouches are sometimes referred to as "original snus". Non-post-moisturized pouched products are sometimes referred to as "white snus" and are by some users considered to have a more appealing appearance. The moisture content of the final oral pouched smokeless tobacco product comprising moist or semi-dry snuff is normally within the range of from 25 to 55% w/w based on the weight of the pouched product (i.e. the total weight of snuff and pouch material).

Pouched smokeless tobacco products may be produced by measuring portions of the smokeless tobacco composition and inserting the portions into a nonwoven tube. U.S. Pat. No. 4,703,765 discloses a device for packaging precise amounts of finely divided tobacco products, such as snuff tobacco or the like, in a tubular packaging material into which snuff portions are injected via a fill tube. Downstream from the tube, welding means are positioned for transverse sealing of the packaging material, and also cutting means for severing the packaging material in the area of the transverse seal to thus form discrete or individual portion packages. EP 2428450 B1 relates to a snus dosing method, wherein a portion of tobacco is filled into a dosing chamber of a dosing device and then blown out of the dosing chamber by means of blow-out air to which water vapor has been added.

Pouched smokeless tobacco products may alternatively be produced by placing portions of moist snuff on a nonwoven web using a pouch packer machine in accordance with the device disclosed in U.S. Pat. No. 6,135,120. This device comprises feeding means for feeding the tobacco material into pockets formed in a rotary portioning wheel for portioning the material into portions, at least one compression means for compressing the tobacco material portions, a unit for advancing a packaging material, such as a nonwoven web, in synchrony with the compressed portions, at least one discharge means for discharging the portions from the pockets to the packaging material, and a forming unit for forming individual portion packages (i.e. pouched smokeless tobacco products) from the discharged portions and the packaging material. At the intended point of discharge of the portions of to the packaging material, said packaging material has the form of a tape, the compression means being arranged to compress the portions in a direction which differs from the discharging and the feeding directions. The compression is preferably effected in a direction perpendicular to the discharging and the feeding directions. The compression may be effected in the axial direction of the portioning wheel whereas the feeding and discharging may be effected in the radial direction of said wheel. This technique is herein referred to as the "NYPS" technique.

The individual portions are sealed and cut apart thereby forming rectangular "pillow shaped" (or any other desired form) pouched products. Generally, each final pouched product includes parallel transverse seams at opposite ends and a longitudinal seam orthogonal to the transverse seams. The seals must be of sufficient strength to preserve the integrity of the pouched product during use while not disturbing the user's experience.

In the packaging process in which the pouched smokeless tobacco products, such as portion-packed snus, are formed, it is desirable to minimize waste in order to improve production efficiency and thereby save money. It is, for instance, desired to keep the variation in weight between the resulting pouched smokeless tobacco products low in order to reduce the number of disqualified pouched products containing a too low or a too high amount of smokeless tobacco, i.e. falling outside the given product specific weight range.

Pouched smokeless tobacco products, such as portion-packed snus, may have a tendency to be harder than moist snuff in loose form. Hard portion-packed snus are by most users considered undesirable. This problem may be more pronounced for pouched products where the portions of the smokeless tobacco composition have been compressed during the manufacturing process, such as when using the herein referenced NYPS technique.

Thus, there is a need for a method for producing pouched smokeless tobacco products which provides for reduced waste during pouch formation (i.e. during portion-packaging of smokeless tobacco composition). There is also a need for a method for producing pouched smokeless tobacco products which provides a desired softness of the pouched smokeless tobacco product.

SUMMARY OF THE INVENTION

An object of the present invention is to alleviate one or more of the problems discussed above and to provide advantages and aspects not provided by hitherto known methods for producing pouched smokeless tobacco products.

According to a first aspect, there is provided a method for producing pouched smokeless tobacco products which method comprises the following:

providing an initial tobacco preparation comprising divided tobacco material (e.g. ground or cut tobacco material), optionally salt, optionally pH adjuster and optionally one or more additional ingredients, said initial tobacco preparation having a water content below 20% w/w;

heating the initial tobacco preparation in a first heating step to a temperature within the range of from 70° C. to 170° C. for a time period within the range of from 10 minutes to 72 hours to provide a heat-treated tobacco preparation;

providing a smokeless tobacco composition comprising said heat-treated tobacco preparation, such as by adding water, optionally adding salt, optionally adding pH adjuster and optionally adding one or more additional ingredients in one or more steps to the heat-treated tobacco preparation, optionally including one or more additional heating steps; and enclosing portions of said smokeless tobacco composition in saliva-permeable pouch material thereby providing pouched smokeless tobacco products.

The first heating step may reduce the microorganism content of the initial tobacco preparation and thus provide a heat-treated tobacco preparation having reduced microorganism content. In particular, the first heating step may reduce the microorganism content of the initial tobacco preparation with at least 50%, such as at least 70%, at least 80%, at least 90%, at least 95% or at least 99%.

The first heating step may provide a heat-treated tobacco preparation having less than 10 000 colony forming units (CFU) of microorganisms, such as bacteria, per gram as measured using the herein described spread plate method. Thus, the first heating step may provide a pasteurized, heat-treated tobacco preparation.

It has been found that the waste during pouch formation, i.e. when portions of smokeless tobacco composition are enclosed in saliva-permeable pouch material, is reduced when the method as disclosed herein is used compared to when heat-treatment is carried out on a tobacco preparation having higher water content, such as above 20% w/w. Thus, the production efficiency may be improved and money saved. It has been found that a narrower weight distribution is provided for pouched smokeless tobacco products produced in accordance with the method as disclosed herein compared to when heat-treatment is carried out on an initial tobacco preparation having higher water content. Thus, the weight variance between pouched snus products is reduced for pouched smokeless tobacco products produced in accordance with the method as disclosed herein compared to when heat-treatment is carried out on an initial tobacco preparation having higher water content. In addition, it has been found that the risk for contamination of seals with smokeless tobacco composition during pouch formation is reduced when the method as disclosed herein is used compared to when heat-treatment is carried out on an initial tobacco preparation having higher water content.

It has also been found that a pouched smokeless tobacco product produced in accordance with the method as disclosed herein exhibits a desired softness.

It is also believed that when an initial tobacco preparation having a water content below 20% w/w, such as a water content within the range of from 3 to 19% w/w or from 3 to 17% w/w or from 3 to 15% w/w, or at most 10% w/w, such as within the range of from 3 to 10% w/w or from 5 to 8% w/w, is heat-treated in accordance with the method as disclosed herein, the smokeless tobacco composition obtained may exhibit improved rheological properties, such as improved flow properties. Thus, the resulting smokeless tobacco composition may be easier to handle and transport during the manufacturing process.

In addition, said heat-treatment of an initial tobacco preparation having a water content below 20% w/w, such as a water content within the range of from 3 to 19% w/w or from 3 to 17% w/w or from 3 to 15%, or at most 10% w/w, such as within the range of from 3 to 10% w/w or from 5 to 8% w/w, may provide an increased formation of aroma and taste compounds which provides desired organoleptic properties of the pouched smokeless tobacco product.

Moreover, said heat-treatment of an initial tobacco preparation having a water content below 20% w/w, such as a water content within the range of from 3 to 19% w/w or from 3 to 17% w/w or from 3 to 15%, or at most 10% w/w, such as within the range of from 3 to 10% w/w or from 5 to 8% w/w, may provide for a shorter process time in comparison to heat-treatment of tobacco having higher water content at the same temperature.

As disclosed herein, the initial tobacco preparation may consist of divided tobacco material having a water content within the range of from 3% to 15% w/w, such as from 3% to 10% w/w or from 3% to 8% w/w, and one or more ingredients selected from the group consisting of water, salt (e.g. sodium chloride) and non-tobacco plant fibers (e.g. bamboo fibers).

As disclosed herein, the initial tobacco preparation may consist of divided tobacco material having a water content within the range of from 3% to 15% w/w, such as from 3% to 10% w/w or from 3% to 8% w/w, salt (e.g. sodium chloride) and non-tobacco plant fibers (e.g. bamboo fibers).

As disclosed herein, the initial tobacco preparation may consist of divided tobacco material having a water content within the range of from 3% to 15% w/w, such as from 3% to 10% w/w or from 3% to 8% w/w, and salt (e.g. sodium chloride).

As disclosed herein, the initial tobacco preparation may consist of divided tobacco material having a water content within the range of from 3% to 15% w/w, such as from 3% to 10% w/w or from 3% to 8% w/w.

DETAILED DESCRIPTION

Figure 1:
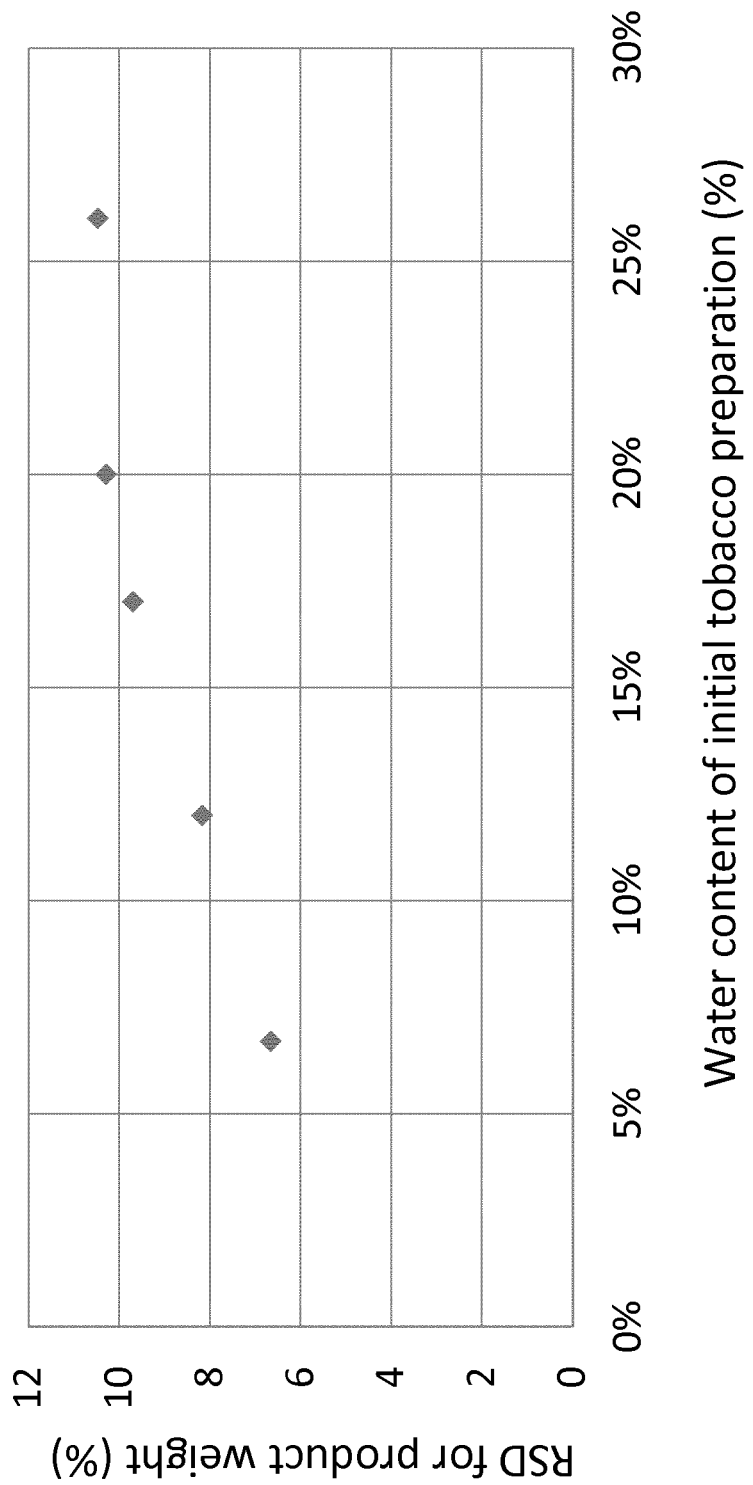
FIG. 1 illustrates the impact of water content of the initial tobacco preparation subjected to heat treatment (for about 4 hours, temperature varied between 75° C. and 102° C.) on weight variance of pouched snus products produced with a Merz SB 53-2/T pouch packer machine.

By "tobacco" is meant any part, e.g., leaves, stems, and stalks, of any member of the genus *Nicotiana*. The tobacco may be whole, shredded, threshed, cut, ground, cured, aged, fermented, or otherwise, e.g., granulated or encapsulated.

The term "tobacco material" is used herein for tobacco leaves or parts of leaves, such as lamina and stem. The leaves and parts of leaves may be finely divided (disintegrated), such as ground, cut, shredded or threshed, and the parts of leaves may be blended in defined proportions in the tobacco material.

"Oral" and "oral use" is in all contexts used herein as a description for use in the oral cavity, such as buccal placement.

As used herein "pouched smokeless tobacco product for oral use" or "oral pouched smokeless tobacco product" refers to a portion of smokeless tobacco packed in a saliva-permeable pouch material intended for oral use.

As used herein, the term "moisture content" refers to the total amount of oven volatile ingredients, such as water and other oven volatiles (e.g. propylene glycol) in the preparation, composition or product referred to. The moisture content is given herein as percent by weight (wt %) of the total weight of the preparation, composition or product referred to. The moisture content as referred to herein may be determined by using the method disclosed in the Examples in which the oven volatile content at a temperature of about 105° C. is determined.

As used herein, the term "water content" refers to the total amount of water in the preparation, composition or product referred to. The water content is given herein as percent by weight (wt %) of the total weight of the preparation, composition or product referred to. Water content may be measured by using a standardized method for water analysis, such as, Karl Fischer titration or gas chromatography (GC).

The term "additional ingredient" as used herein denotes substances other than tobacco material, salt (e.g. sodium chloride, potassium chloride, magnesium chloride, calcium chloride and any combinations thereof), pH adjuster (e.g. sodium hydroxide, potassium hydroxide, potassium carbonate, sodium carbonate or sodium bicarbonate) and water.

"Flavour" or "flavouring agent" is used herein for a substance used to influence the aroma and/or taste of the smokeless tobacco product, including, but not limited to, essential oils, single flavour compounds, compounded flavourings, and extracts.

As used herein, the term "steam" refers to water in gaseous form, which is formed when water reaches its boiling point.

As used herein "finely divided" means an average particle size of less than 2 mm. The particles of the finely divided tobacco material may be sized to pass through a screen of about 10 (US) mesh, i.e. sieve size 2.0 mm, or 18 (US) mesh, i.e. sieve size 1.0 mm.

As used herein "% w/w" or "wt %" or "weight %" refers to weight percent of the ingredient referred to of the total weight of the preparation, composition or product referred to.

As used herein, reference to "dry weight percent" refers to weight percent of the ingredient referred to on the basis of the total weight of dry ingredients, i.e. all ingredients of the preparation, composition or product referred to excluding moisture content.

As used herein, the term "pasteurized" means less than 10 000 colony forming units (CFU) of microorganisms, such as bacteria, per gram. Colony forming units (CFU) of microorganisms, such as bacteria, per gram tobacco preparation may be determined using the herein described spread plate method.

As disclosed herein, there is provided a method for producing pouched smokeless tobacco products for oral use, said method comprising providing an initial tobacco preparation comprising divided tobacco material, optionally salt, optionally pH adjuster and optionally one or more additional ingredients, said initial tobacco preparation having a water content below 20% w/w, such as within the range of from 3 to 19% w/w;

heating the initial tobacco preparation in a first heating step to a temperature within the range of from 70° C. to 170° C. for a time period within the range of from 10 minutes to 72 hours to provide a heat-treated tobacco preparation;

providing a smokeless tobacco composition comprising said heat-treated tobacco preparation; and enclosing portions of said smokeless tobacco composition in saliva-permeable pouch material thereby providing pouched smokeless tobacco products.

In the method disclosed herein, the water content of the initial tobacco preparation may be at most 17% w/w, such as within the range of from 3 to 17% w/w, or at most 15% w/w, such as within the range from 3 to 15% w/w or from 3 to 12% w/w, or at most 10% w/w, such as within the range of from 3 to 10% or 3 to 9% or 5 to 9% w/w or 5 to 8% w/w.

The method may further comprise adding water, optionally adding salt, optionally adding pH adjuster and optionally adding one or more additional ingredients in one or more steps to the heat-treated tobacco preparation, optionally including one or more additional heating steps, to thereby provide the smokeless tobacco composition.

The moisture content of the smokeless tobacco composition provided in the method disclosed herein may be within the range of from 10 to 60% w/w, such as within the range of from 15 to 60% w/w or 20 to 60% w/w or 20 to 58% w/w or 30 to 56% w/w or 40 to 54% w/w.

The smokeless tobacco composition may comprise divided tobacco material (provided by the heat-treated initial tobacco preparation), salt (e.g. sodium chloride, potassium chloride, magnesium chloride, calcium chloride and any combinations thereof), pH adjuster (e.g. sodium hydroxide, potassium hydroxide, potassium carbonate, sodium carbonate or sodium bicarbonate), and optionally one or more additional ingredients, such as flavouring agents, cooling agents, heating agents, sweetening agents, colorants, humectants (e.g. propylene glycol or glycerol), antioxidants, preservatives (e.g. potassium sorbate), binders, fillers, non-tobacco plant fibers and disintegration aids. The smokeless tobacco composition may be a moist snuff composition, such as a snus composition.

Typically, the amount of tobacco material in the smokeless tobacco composition is within the range of from about 50 to 80% w/w based on dry weight of the smokeless tobacco composition.

Salt, such as sodium chloride, potassium chloride, magnesium chloride, calcium chloride and any combinations thereof, is added mainly for its taste enhancing properties, but it also has a preservative effect which contributes to improved shelf life of the product. Salt, such as sodium chloride lowers the water activity of the products, thus preventing micro-organisms from growing. The natural occurrence of sodium chloride in tobacco material is normally below 2% w/w, typically below 1% w/w, based on dry weight of the tobacco material. Normally, the amount of added salt in the smokeless tobacco composition is within the range of from about 0.5 to about 10% w/w based on dry weight of the smokeless tobacco composition. All salt of the smokeless tobacco composition may be included in the initial tobacco preparation. Alternatively, all salt of the smokeless tobacco composition may be added to the heat-treated tobacco preparation. Further alternatively, a first amount of salt may be contained in the initial tobacco preparation and a second amount of salt may be added to the heat-treated tobacco preparation.

pH adjusters, such as sodium carbonate, are added to bring the pH value of the smokeless tobacco composition to the slightly alkaline side, such as about pH 7.5 to 8.5. Sodium carbonate may also be used to give the products their characteristic aroma profile. Typically, the amount of pH adjuster in the smokeless tobacco composition is less than about 7% w/w, such as within the range of from 3 to 5% w/w, based on dry weight of the tobacco composition. All pH adjuster of the smokeless tobacco composition may be included in the initial tobacco preparation. Alternatively, all pH adjuster of the smokeless tobacco composition may be added to the heat-treated tobacco preparation. Further alternatively, a first amount of pH adjuster may be contained in the initial tobacco preparation and a second amount of pH adjuster may be added to the heat-tobacco preparation.

Humectants, such as propylene glycol or glycerol, may also be added to protect the product from drying out and may also have a preservative effect since the water activity of the product will be lowered, thereby preventing microorganisms from growing. Normally, the amount of humectant in the smokeless tobacco composition is within the range of from about 5 to about 15% w/w based on dry weight of the smokeless tobacco composition Flavours used are generally natural or nature identical compounds that comply with food regulations. Flavours are usually dissolved in a solvent, such as ethanol, when added.

In addition, the smokeless tobacco composition may optionally comprise other botanical filling material, such as any non-tobacco plant fiber. Examples of non-tobacco plant fibers are maize fibers, oat fibers, tomato fibers, barley fibers, rye fibers, sugar beet fibers, buck wheat fibers, potato fibers, cellulose fibers, apple fibers, cocoa fibers, bamboo fibers and citrus fibers. The amount of non-tobacco plant fibers, such as bamboo fibers, in the smokeless tobacco composition may be within the range of from about 1 to about 60% w/w or from about 2 to about 20% w/w based on dry weight of the smokeless tobacco composition.

The initial tobacco preparation comprises divided tobacco material, such as cut (shredded) or ground tobacco material. The initial tobacco preparation may comprise finely divided tobacco material, such as cut (shredded) or ground tobacco material, in granulated form or powder form, i.e. tobacco flour, for instance having an average particle size of about 1 mm to about 2 mm. The tobacco material may be cured (aged) tobacco material.

The initial tobacco preparation comprises at least divided tobacco material, but may optionally also comprise salt (e.g. sodium chloride, potassium chloride, magnesium chloride, calcium chloride and any combinations thereof), pH adjusters (e.g. sodium hydroxide, potassium hydroxide, potassium carbonate, sodium carbonate or sodium bicarbonate) and/or one more additional ingredients, such as flavouring agents, cooling agents, heating agents, sweetening agents, colorants, humectants (e.g. propylene glycol or glycerol), antioxidants, preservatives (e.g. potassium sorbate), binders, fillers, non-tobacco plant fibers and disintegration aids.

Generally, cured and ground or cut tobacco material has moisture content within the range of from 3% to 15% w/w, such as within the range of from 3 to 10% w/w or 5% to 8% w/w. The content of oven volatiles other than water (i.e. non-aqueous oven volatiles) is normally less than 1% by weight in tobacco flour generally used in the production of smokeless tobacco products. Thus, the amount of non-aqueous oven volatiles in the tobacco material is normally substantially negligible and therefore the moisture content of tobacco material as measured using the herein described method substantially corresponds to the water content of the tobacco material. Generally, the pH of divided tobacco material, such as tobacco flour, used in production of smokeless tobacco compositions is within the range of from 4 to 6, such as within the range of from 4.5 to 6. The initial tobacco preparation used in the method as disclosed herein may comprise divided tobacco material having a pH of equal to or lower than 8, such as a pH of equal to or lower than 6, and in particular a pH within the range of from 4 to 6.

pH of divided tobacco material, such as tobacco flour, can be measured by adding 100 ml of distilled water to 5 gram of tobacco material, for instance in a 100 ml Erlenmeyer flask, stirring the resulting mixture at room temperature with a magnetic stirrer at 100 rpm for about 5 minutes, and then measuring the pH of an extract obtained therefrom with a calibrated (according to the manufacturer's instructions) pH meter. For correctness of readings, the sample solutions shall be analyzed within one hour.

Thus, the initial tobacco preparation used in the method as disclosed herein may comprise or consist of tobacco material, such as cured and ground or cut tobacco material, having a water content within the range of from 3% to 15% w/w, such as from 3% to 10% w/w or 3% to 8% w/w, and added water (i.e. water added to the tobacco material), said initial tobacco preparation having a water content below 20% w/w, such as at most 15% w/w or at most 10% w/w.

The initial tobacco preparation used in the method as disclosed herein may comprise tobacco material, such as cured and ground or cut tobacco material, having a water content within the range of from 3% to 15% w/w, such as from 3% to 10% w/w or 3% to 8% w/w, and no added water, said initial tobacco preparation having a water content of at most 15% w/w, such as from 3% to 10% w/w or 3% to 8% w/w.

The initial tobacco preparation used in the method as disclosed herein may consist of tobacco material, such as cured and ground or cut tobacco material, having a water content within the range of from 3% to 15% w/w, such as from 3% to 10% w/w or 3% to 8% w/w.

The initial tobacco preparation used in the method disclosed herein may comprise divided tobacco material, such as ground or cut tobacco material, having a water content within the range of from 3% to 15% w/w (with or without water added to the tobacco material), such as from 3% to 10% w/w or 3% to 8% w/w, and added salt (e.g. sodium chloride, potassium chloride, magnesium chloride, calcium chloride and any combinations thereof), said initial tobacco preparation having a water content below 20% w/w, such as at most 15% w/w or at most 10% w/w. The content of salt in the initial tobacco preparation may be within the range of from 1% to 15% w/w or from 5% to 10% w/w.

In particular, the initial tobacco preparation used in the method as disclosed herein may consist of tobacco material, such as cured and ground or cut tobacco material, having a water content within the range of from 3% to 15% w/w, such as from 3% to 10% w/w or 3% to 8% w/w, added salt (e.g. sodium chloride, potassium chloride, magnesium chloride, calcium chloride and any combinations thereof) and added water, said initial tobacco preparation having a water content below 20% w/w, such as at most 15% w/w or at most 10% w/w.

In particular, the initial tobacco preparation used in the method as disclosed herein may consist of tobacco material, such as cured and ground or cut tobacco material, having a water content within the range of from 3% to 15% w/w, such as from 3% to 10% w/w or 3% to 8% w/w, and added salt (e.g. sodium chloride, potassium chloride, magnesium chloride, calcium chloride and any combinations thereof), said initial tobacco preparation having a water content of at most 15% w/w or at most 10% w/w.

The initial tobacco preparation used in the method disclosed herein may comprise divided tobacco material, such as ground or cut tobacco material, having a water content within the range of from 3% to 15% w/w, such as from 3% to 10% w/w or 3% to 8% w/w, added salt (e.g. sodium chloride, potassium chloride, magnesium chloride, calcium chloride and any combinations thereof), pH adjuster (e.g. sodium hydroxide, potassium hydroxide, potassium carbonate, sodium carbonate or sodium bicarbonate) and optionally one or more additional ingredients (e.g. flavouring agents) as exemplified herein below, said initial tobacco preparation having a water content below 20% w/w, such as at most 15% w/w or at most 10% w/w.

The initial tobacco preparation used in the method disclosed herein may comprise divided tobacco material, such as ground or cut tobacco material, pH adjuster (e.g. sodium hydroxide, potassium hydroxide, potassium carbonate, sodium carbonate or sodium bicarbonate) and optionally one or more additional ingredients as exemplified herein below (e.g. flavouring agents), said initial tobacco preparation having a water content below 20% w/w, such as at most 15% w/w or at most 10% w/w.

The initial tobacco preparation used in the method disclosed herein may consist of divided tobacco material, such as ground or cut tobacco material, having a water content within the range of from 3% to 15% w/w, such as from 3% to 10% w/w or 3% to 8% w/w, added salt (e.g. sodium chloride, potassium chloride, magnesium chloride, calcium chloride and any combinations thereof) and non-tobacco plant fibers (e.g. bamboo fibers), said initial tobacco preparation having a water content of at most 15% w/w or at most 10% w/w.

The initial tobacco preparation used in the method disclosed herein may consist of divided tobacco material, such as ground or cut tobacco material, having a water content within the range of from 3% to 15% w/w, such as from 3% to 10% w/w or 3% to 8% w/w, added salt (e.g. sodium chloride, potassium chloride, magnesium chloride, calcium chloride and any combinations thereof), non-tobacco plant fibers (e.g. bamboo fibers), and added water, said initial tobacco preparation having a water content below 20% w/w, such as at most 15% w/w or at most 10% w/w. Thus, the initial tobacco preparation having a water content below 20% w/w, such as at most 15% w/w or at most 10% w/w, may be prepared by adding water and salt to divided tobacco material having a water content within the range of from 3% to 15% w/w, such as from 3% to 10% w/w or 3% to 8% w/w.

The above mentioned one or more additional ingredients may be selected from the group consisting flavouring agents, cooling agents, heating agents, sweetening agents, colorants, humectants (e.g. propylene glycol or glycerol), antioxidants, preservatives (e.g. potassium sorbate), binders, fillers, non-tobacco plant fibers, and disintegration aids.

The initial tobacco preparation may be loaded into a vessel, such as a vessel provided with stirring means and optionally jacketed (e.g. a vessel with water jacket), and the initial tobacco preparation may be heated by any appropriate method. The initial tobacco preparation may be heated by a method selected from the group consisting of steam injection, jacket heating, hot gas injection, microwave treatment, heating chamber and any combinations thereof. The vessel may be an open vessel or a pressurized vessel, such as a pressurized vessel configured to admit venting. The method may include loading of the tobacco preparation into a system that includes two or more vessels arranged in sequence or a vessel with multiple zones.

The initial tobacco preparation is heated to a temperature of at least 70° C., such as within the range of from 70° C. to 170° C. or from 70° C. to 150° C., or at least 80° C., such as within the range of from 80° C. to 170° C. or from 80° C. to 150° C. or from 80° C. to 130° C., or at least 90° C., such as within the range of from 90° C. to 170° C. or from 90° C. to 150° C. or from 90° C. to 130° C. or from 90 to 110° C. Heating may be repeated one or more times. The initial tobacco preparation may be subjected to multiple cycles of heating and absence of heating and/or cooling/chilling (e.g. by flowing cold water through the water jacket of the vessel).

The initial tobacco preparation is heated, in one or more steps, for a period of time long enough and at a temperature high enough to meet the demands for pasteurization, thereby ensuring negligible levels of bacteria, i.e. less than log 4 (i.e. 10 000) colony forming units (CFU) per gram tobacco preparation as measured by, for instance, the herein described spread plate method. When a lower temperature, such as 70° C., is used for the heat treatment, the initial tobacco preparation may be heat-treated for a longer period of time, such as at least 9 hours.

The inherent content of microorganisms in the tobacco preparation prior to pasteurization may be within the range of from about log 7 to about log 8 CFU per gram (i.e. from 10 000 000 to 100 000 000 CFU per gram), but the microorganism content may be higher or lower since it depends on several factors, such as tobacco harvesting method, tobacco variety, handling requirements, etc.

The temperature and the time period of the first heating may be selected such that the microorganism content of the initial tobacco preparation is reduced and a heat-treated tobacco preparation having reduced microorganism content is provided. In particular, the first heating step may reduce the microorganism content of the initial tobacco preparation with at least 50%, such as at least 70%, at least 80%, at least 90%, at least 95% or at least 99%.

In particular, the temperature and the time period of the first heating may be selected such that tobacco preparation is pasteurized and a heat-treated tobacco preparation having less than 10 000 colony forming units (CFU) of microorganisms per gram, as measured using the herein described spread plate method, is provided.

Heat treatment of tobacco using steam injection (i.e. injection of water in gas phase) into a vessel containing the initial tobacco preparation has been found to be advantageous in comparison to instead using jacket heating or a heating chamber, since the tobacco is heated rapidly by the steam. Rapid heating reduces the risk for transformation of bacteria into resistant bacterial spores.

When steam having a temperature of about 145° C. and a pressure of about 4.5 bar, as measured at an inlet of the vessel, is injected into a vessel containing an initial tobacco preparation as disclosed herein, it takes about 5 to 15 minutes for the tobacco to reach a temperature of about 100° C.

The temperature of said first heating step may be within the range of from 70° C. to 170° C. for a time period of at least 10 minutes, such as at least 30 minutes, at least 1 hour, at least 3 hours or at least 5 hours.

The temperature of said first heating step may be within the range of from 70° C. to 170° C. for a time period within the range of from 10 minutes to 72 hours, such as within the range of from 30 minutes to 24 hours or from 1 hour to 10 hours.

Using steam injection, the temperature of said first heating step may be 70° C. for a time period of at least 9 hours, such as within the range of from 9 hours to 72 hours or from 9 hours to 24 hours.

Using steam injection, the temperature of said first heating step may be 90° C. for a time period of at least 15 minutes, such as within the range of from 15 minutes to 72 hours or from 15 minutes to 24 hours, or at least 30 minutes, such as within the range of from 30 minutes to 24 hours, or at least 1 hour, such as from 1 hour to 10 hours, or at least 4 hours, such as from 4 hours to 10 hours.

Using steam injection, the temperature of said first heating step may be 100° C. for a time period of at least 10 minutes, such as within the range of from 10 minutes to 72 hours or from 10 minutes to 24 hours, or at least 30 minutes, such as within the range of from 30 minutes to 24 hours, or at least 1 hour, such as from 1 hour to 10 hours, or at least 4 hours, such as from 4 hours to 10 hours.

The method disclosed herein for producing pouched smokeless tobacco products, may comprise:

providing an initial tobacco preparation comprising tobacco material having a water content within the range of from 3% to 15% w/w, such as within the range of from 3% to 10% w/w or from 5% to 8% w/w, and optionally salt;

heating the initial tobacco preparation in a first heating step to a temperature within the range of from 70° C. to 170° C. for a time period within the range of from 10 minutes to 72 hours to provide a heat-treated tobacco preparation;

adding water, optionally adding salt, optionally adding pH adjuster (e.g. sodium hydroxide, potassium hydroxide, potassium carbonate, sodium carbonate or sodium bicarbonate), optionally adding one or more additional ingredients, such as humectant (e.g. propylene glycol) and/or flavours, in one or more steps to the heat-treated tobacco preparation, optionally including one or more additional heating steps, to provide a smokeless tobacco composition having a moisture content within the range of from 10 to 60% w/w, such as within the range of from 15 to 60% w/w or 20 to 60% w/w or 20 to 58% w/w or 30 to 56% w/w or 40 to 54%; and enclosing portions of said smokeless tobacco composition in saliva-permeable pouch material thereby providing pouched smokeless tobacco products.

The method disclosed herein for producing pouched smokeless tobacco products, may comprise:

providing an initial tobacco preparation comprising tobacco material having a water content within the range of from 3% to 15% w/w, such as within the range of from 3% to 10% w/w or from 5% to 8% w/w, and optionally salt;

heating the initial tobacco preparation to a temperature within the range of from 70° C. to 170° C. for a time period within the range of from 10 minutes to 72 hours, such as at least 30 minutes, at least 1 hour, at least 3 hours or at least 5 hours, in a first heating step to provide a heat-treated tobacco preparation;

adding water, optionally adding salt, optionally adding pH adjuster (e.g. sodium hydroxide, potassium hydroxide, potassium carbonate, sodium carbonate or sodium bicarbonate), optionally adding one or more additional ingredients, such as humectant (e.g. propylene glycol) and/or flavours, in one or more steps to the heat-treated tobacco preparation and heating to a temperature of at least 60° C., such as within the range of from 70° C. to 170° C., for a time period of at least 10 minutes, such as at least 30 minutes, at least 1 hour, at least 3 hours or at least 5 hours, in a second heating step, optionally including one or more additional heating steps;

providing a smokeless tobacco composition comprising said heat-treated tobacco preparation and having a water content within the range of from 10 to 60% w/w, such as within the range of from 15 to 60% w/w or 20 to 60% w/w or 20 to 58% w/w or 30 to 56% w/w or 40 to 54%; and enclosing portions of said smokeless tobacco composition in saliva-permeable pouch material thereby providing pouched smokeless tobacco products.

The first heating step may reduce the microorganism content of the initial tobacco preparation and thus provide a heat-treated tobacco preparation having reduced microorganism content. In particular, the first heating step may reduce the microorganism content of the initial tobacco preparation with at least 50%, such as at least 70%, at least 80%, at least 90%, at least 95% or at least 99%.

The second heating step, and any optional additional heating steps, may reduce the microorganism content further.

Thus, the first heating step together with the second heating step, and any optional additional heating steps, may provide a heat-treated, pasteurized tobacco preparation having less than 10 000 colony forming units (CFU) of microorganisms per gram as measured using the herein described spread plate method.

In the method as disclosed herein, each of said portions of the smokeless tobacco composition may be compressed, for instance by using the herein referenced NYPS technique as described in U.S. Pat. No. 6,135,120, prior to enclosing the portions in the saliva-permeable pouch material.

The pouched smokeless tobacco product obtainable by using the method as disclosed herein comprises a smokeless tobacco composition and a pouch enclosing the smokeless tobacco composition. The pouch may be made of a fleece material, such as viscose nonwoven.

The pouched smokeless tobacco product as disclosed herein are intended for use in the oral cavity, such as buccal placement (e.g. by placing the pouched product between the upper or lower gum and the lip or cheek), and may therefore also be referred to as oral pouched smokeless tobacco products or portion-packed (pouched) smokeless tobacco products for oral use. The pouched product is normally sized and configured to fit comfortably and discreetly in a user's mouth between the upper or lower gum and the lip or cheek.

The pouched smokeless tobacco products provided using the method as disclosed herein may be post-moisturized or non-post-moisturized.

The moisture content of the pouched smokeless tobacco product provided using the method as disclosed herein may be within the range of from 1 to 70% w/w, such as within the range of from 10 to 60% w/w or from 15 to 60% w/w or from 20 to 60% w/w or from 20 to 58% w/w or from 30 to 56% w/w or from 40 to 54% w/w.

The pouched smokeless tobacco product provided using the method as disclosed herein may be non-post-moisturized.

When making snus according to GothiaTek® standard, which implies hygienic handling of all ingredients and pasteurization of the loaded materials thus assuring a final tobacco composition with negligible levels of bacteria, the typical main ingredients, besides tobacco, are water, sodium chloride (NaCl) and sodium carbonate ($Na_2CO_3$). Flavours and humectants (e.g. propylene glycol or glycerol) and other additional ingredients might also be used.

There are normally two major steps in the manufacturing process of converting tobacco to a snus composition; a) grinding (or cutting) and sieving and b) snus-processing.

a) Grinding and Sieving

Generally, tobacco flour is produced by batch grinding. Compressed tobacco is emptied from its cases and torn to large fragments which are cut to pieces. The cut tobacco pieces are dried and transported to a mill. The tobacco is ground and ground tobacco particles are sieved and separated into fractions. Too large particles may be brought back to the mill for re-grinding. The cutting, grinding and sieving is done in equipment where foreign objects such as fragments of metallic material and stones are separated and removed from the tobacco. A number of approved fractions are weighed in separate fractions scales. The weighed tobacco flour fractions are collected to pre-set quantities in a container and blended by circulation. The blended tobacco flour is stored in a container. Different types of tobacco flours are kept in separate containers.

b) Snus-Processing

The snus mixture (herein referred to as smokeless tobacco composition) is produced by batch processing and should be carried out in a closed system to minimize the risk of contamination from bacteria or foreign substances. Since automatic feeding of tobacco and the other ingredients is preferred, the whole process may be computer controlled and can be run day and night, all week around.

The hitherto used process normally starts with loading of tobacco material in powder form (tobacco flour), water, sodium chloride (NaCl) and possibly one or more additional ingredients, into a cylindrical blender. Loading is done while stirring. The loaded materials are mixed to a homogeneous blend (herein referred to as initial tobacco preparation), which is heated by injection of steam. The blend is then kept heated for several hours with support of steam to ensure reduction of the natural bacterial flora in the tobacco and to bring texture, taste and color to the snus blend. Time, temperature and frequency of stirring during heat treatment, parameters specified for different snus blend qualities, are preferably controlled by a process computer program. The heat treatment is traditionally referred to as "sweating". After heat treatment, the blend is normally chilled by flow of cold water through the blender jacket during stirring. Water, sodium carbonate and one or more additional ingredients, such as flavours, may then be added to the chilled blend. The blend is finally mixed to a homogeneous snus composition.

The invention will now be illustrated by means of the following non-limiting examples.

EXAMPLES

In all the following examples, the moisture content of each of the tobacco material and the non-tobacco plant fibers, if present, was determined by using a method based on literature references Federal Register/vol.74, no. 4/712-719/Wednesday, Jan. 7, 2009/Notices, "Total moisture determination" and AOAC (Association of Official Analytical Chemics), Official Methods of Analysis 966.02: "Moisture in Tobacco" (1990), Fifth Edition, K. Helrich (ed). In this method, the oven volatile (OV) content of the tobacco material and the non-tobacco plant fibers, if present, is measured as described hereinafter.

The moisture content (i.e. the oven volatile content) of each of the tobacco material and the non-tobacco plant fibers, if present, was determined gravimetrically by taking 2.5±0.25 g sample and weighing the sample before evaporation of moisture and after evaporation of moisture. Mettler Toledo's Moisture Analyzer HB43, a balance with halogen heating technology, was used (instead of an oven and a balance as in the mentioned literature references) in the experiments disclosed herein. The sample was heated to 105° C. (instead of 99.5±0.5° C. as in the mentioned literature references). The measurement was stopped when the weight change was less than 1 mg during a 90 seconds time period. The moisture content (i.e. oven volatile content) as weight percent of the original weight of the sample is then calculated automatically by the Moisture Analyzer HB43.

As mentioned herein above, the content of oven volatiles other than water (i.e. non-aqueous oven volatiles) in tobacco flour, and in bamboo fibres as used herein, is normally less than 1% by weight. Therefore the moisture content of tobacco material as measured using the herein described method substantially corresponds to the actual water content of the tobacco material. The same reasoning applies to bamboo fibers as used herein. In the examples, the given water content of the initial tobacco preparations is the calculated sum of oven volatiles content of the tobacco material and the non-tobacco plant fibers (e.g. bamboo fibers), if present, as measured by the above disclosed method, and, where applicable, the amount of water added to the tobacco material in the process.

Moreover, in the Examples, the given water content of the smokeless tobacco composition is the calculated sum of the total amount of added water in the process and the moisture content (i.e. oven volatile content) of the tobacco material and non-tobacco fibers (e.g. bamboo fibers) if present, as measured by the above disclosed method.

In the Examples, the given moisture content of the smokeless tobacco composition is the calculated sum of the total amount of added water and added propylene glycol and added flavours, if present, in the process and the moisture content (i.e. oven volatile content) of the tobacco material and non-tobacco fibers (e.g. bamboo fibers) if present, as measured by the above disclosed method.

The content of microorganisms in the tobacco preparation after heat treatment and in the final smokeless tobacco composition (snus) may be measured using the hereinafter described spread plate method.

Spread Plate Method to Determine Microorganisms Content 10 g tobacco preparation (or snus) is placed in sterile Stomacher bags (supplied by LabRobot) and diluted with 90 g sterile 0.85% w/w NaCl solution. The mixture is homogenized for 1 minute in a Masticator. A 100 µl sample is taken out using a sterile pipette and is spread onto a sterile tryptone soy agar (TSA) plate using a sterile spreader (dilution 2).

Further, a 1 000 µl sample of the above mixture is diluted with 9 ml sterile 0.85% w/w NaCl solution in a sterile Dilucup (supplied by LabRobot) and mixed using a Dilushaker (supplied by LabRobot).

Again, a 100 µl sample is spread onto a sterile TSA plate (dilution 3).

Optionally, a 1 000 µl sample from the above Dilucup (dilution 3) is further diluted with 9 ml sterile 0.85% w/w NaCl solution in second sterile Dilucup and mixed using a Dilushaker. Again, a 100 µl sample is spread onto a sterile TSA plate (dilution 4).

The TSA plates are then incubated for 48 hours at 35° C. in an incubator (supplied by Heraeus), where after the number of colony forming units (CFU) are counted, using Scan 100 Interscience, on the TSA plates which have a number of CFU's ranging between 0 and 300 CFU. The result of the analysis is presented as the logarithm of the number of CFU's per gram of snus (log CFU/g).

Example 1

Impact of Water Content of Initial Tobacco Preparation on Weight Variance of Pouched Smokeless Tobacco Products Packed with Merz SB 53-2/T Pouch Packer Machine Smokeless tobacco compositions suitable for pouch packing using Merz SB 53-2/T pouch packer were made according to GothiaTek® standard containing the ingredients as specified in Table 1.1.

TABLE 1.1

| Ingredients of smokeless tobacco composition | wt % |
| --- | --- |
| Tobacco flour (containing lamina and stem), dry weight | 58.1 |
| Water content | 33.0 |
| Sodium chloride (NaCl) | 5.8 |
| Sodium carbonate ($Na_2CO_3$) | 3.1 |

The moisture content of the composition given in Table 1.1 is about 33% w/w.

a) Heat Treatment of Initial Tobacco Preparation

First, five initial tobacco preparations containing tobacco flour, added sodium chloride and different amounts of moisture (including moisture contained in the tobacco flour and, where applicable, water added to the tobacco flour), as specified in Table 1.2, were prepared. The initial tobacco preparations contained all the tobacco flour and all the added sodium chloride of the smokeless tobacco composition as specified in Table 1.1.

The moisture content of the tobacco flour used for preparing the initial tobacco preparations was about 7 weight % (as measured with the herein described method).

TABLE 1.2

| Initial tobacco preparations | Tobacco flour, dry weight (kg) | Added NaCl (kg) | Total water* (kg) | Water content* (weight %) |
| --- | --- | --- | --- | --- |
| 1-A | 13.90 | 1.39 | 1.09 | 7 |
| 1-B | 13.90 | 1.39 | 2.09 | 12 |
| 1-C | 13.90 | 1.39 | 3.13 | 17 |
| 1-D (comparative) | 13.90 | 1.39 | 3.82 | 20 |
| 1-E (comparative) | 13.90 | 1.39 | 5.37 | 26 |

*including moisture contained in the tobacco flour and, where applicable, water added to the tobacco flour Each of the initial tobacco preparations was prepared in a ploughshare mixer (Lödige, FM130D) and heat treated for about four hours using a combination of jacket heating and injection of steam to control the temperature. The temperature of the tobacco preparation was varied between 75° C. and 102° C. during the four hours of treatment. All the initial tobacco preparations were subjected to the same treatment process.

b) Preparation of Smokeless Tobacco Composition

A portion of each of the initial tobacco preparations was cooled down at room temperature for about 2 hours to reach a temperature of about 20 to 25° C. and thereafter transferred to a Bjørn varimixer R20 mixer. The appropriate amounts of water and sodium carbonate were added to each portion of the five initial tobacco preparations (1-A to 1-E) and blended for 5 minutes in a Bjørn varimixer R20 mixer to obtain the smokeless tobacco compositions in accordance with Table 1.1.

c) Production of Pouched Smokeless Tobacco Products

The tobacco compositions were packed in pouches using a Merz SB 53-2/T pouch packer machine (supplied by Merz Verpackungsmashinen GmbH) thereby providing pouched smokeless tobacco products. The target weight per pouched product was 0.55 g (including pouch material).

100 pouched products from each composition were weighed on a Mettler Toledo PB602-S/FACT scale and the relative standard deviation (RSD) was calculated using the following formula:

RSD=(Standard Deviation/Average Weight)×100

The results are presented in Table 1.3 and illustrated in FIG. 1.

TABLE 1.3

| Smokeless tobacco composition | Water content of initial tobacco preparation* | RSD for product weight (%) (Merz packer) |
| --- | --- | --- |
| 1-A | 7 | 6.7 |
| 1-B | 12 | 8.2 |
| 1-C | 17 | 9.7 |
| 1-D (comparative) | 20 | 10.3 |
| 1-E (comparative) | 26 | 10.5 |

*including moisture contained in the tobacco flour and, where applicable, water added to the tobacco flour The data in Table 1.3 shows that the weight variance of pouched products produced using a Merz SB 53-2/T machine is significantly reduced while heat-treating an initial tobacco preparation having a water content below 20% w/w, such as within the range of from about 7 to 17% w/w, compared to when heat-treatment is carried out on a tobacco preparation having higher water content, such as 26% w/w.

Example 2

Impact of Water Content of Initial Tobacco Preparation on the Weight Variance of Pouched Smokeless Tobacco Products Packed with a Pouch Packer Machine in Accordance with NYPS Technology Smokeless tobacco compositions suitable for pouch packing using the NYPS technology were made according to GothiaTek® standard containing the following ingredients specified in Table 2.1.

TABLE 2.1

| Ingredients of smokeless tobacco composition | wt % |
| --- | --- |
| Tobacco flour (containing lamina and stem), dry weight | 46.8 |
| Water content | 41.8 |
| Sodium chloride (NaCl) | 4.7 |
| Propylene glycol | 4.2 |
| Sodium carbonate ($Na_2CO_3$) | 2.5 |

The moisture content of the composition given in Table 2.1 is about 46% w/w.

a) Heat treatment of Initial Tobacco Preparation

First, five initial tobacco preparations containing tobacco flour, sodium chloride and different amounts of water (including moisture contained in the tobacco flour and, where applicable, water added to the tobacco flour), as specified in Table 2.2, were prepared. The initial tobacco preparations contained all the tobacco flour and all the added sodium chloride of the smokeless tobacco composition as specified in Table 2.1.

The moisture content of the tobacco flour used for preparing the initial tobacco preparations was about 7 weight % (measured with the herein described method).

TABLE 2.2

| Initial tobacco preparation | Tobacco flour, dry weight (kg) | Added NaCl (kg) | Total water* (kg) | Water content * (weight %) |
| --- | --- | --- | --- | --- |
| 2-A | 13.90 | 1.39 | 1.09 | 7 |
| 2-B | 13.90 | 1.39 | 2.09 | 12 |
| 2-C | 13.90 | 1.39 | 3.13 | 17 |
| 2-D (comparative) | 13.90 | 1.39 | 5.37 | 26 |
| 2-E (comparative) | 13.90 | 1.39 | 8.24 | 35 |

*including moisture contained in the tobacco flour and, where applicable, water added to the tobacco flour Each of the initial tobacco preparations was prepared in a ploughshare mixer (Lödige, FM130D) and heat treated for about four hours using a combination of jacket heating and injection of steam to control the temperature. The temperature of the tobacco preparation was varied between 75° C. and 102° C. during the four hours of heat treatment. All the initial tobacco preparations were subjected to the same treatment process.

b) Preparation of Smokeless Tobacco Compositions

The appropriate amounts of water, propylene glycol and sodium carbonate were added to each of the five initial tobacco preparations (2-A to 2-E) in the ploughshare mixer when the preparations were at 75° C. Further heat treatment for additional 60 minutes at 75° C. was thereafter carried out and the blends were thereafter chilled to about 20° C. by flowing cold water in the mixer jacket for about 2 hours to obtain smokeless tobacco compositions in accordance with Table 2.1.

c) Production of Pouched Smokeless Tobacco Products

The tobacco compositions were packed in pouches using a NYPS pouch packer machine thereby providing pouched smokeless tobacco products. The target weight per pouched product was 1.0 g (including pouch material).

200 pouched products from each composition were weighed on a Mettler PM480 Deltarange scale and the relative standard deviation (RSD) was calculated using the following formula:

RSD=(Standard Deviation/Average Weight)×100

Figure 2:
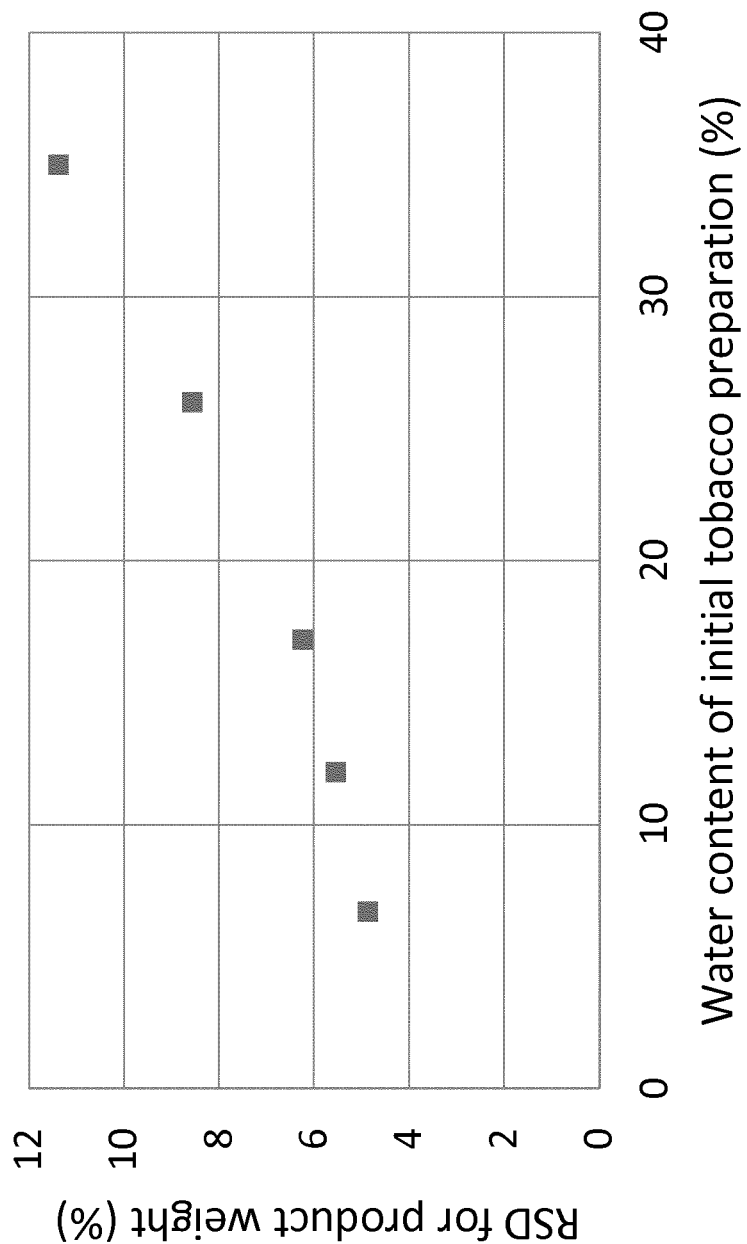
FIG. 2 illustrates the impact of water content of the initial tobacco preparation subjected to heat treatment (for about 4 hours, temperature varied between 75° C. and 102° C.) on weight variance of pouched snus products produced using a pouch packer machine in accordance with the herein referenced NYPS technique.

The results are presented in Table 2.3 and illustrated in FIG. 2.

TABLE 2.3

| Initial tobacco preparation | Water content* of initial tobacco preparation (weight %) | RSD for product weight (%) (NYPS packer) |
| --- | --- | --- |
| 2-A | 7 | 4.9 |
| 2-B | 12 | 5.5 |
| 2-C | 17 | 6.2 |
| 2-D (comparative) | 26 | 8.6 |
| 2-E (comparative) | 35 | 11.4 |

*including moisture contained in the tobacco flour and, where applicable, water added to the tobacco flour.

The data in Table 2.3 shows that the weight variance of pouched products produced using a NYPS machine is significantly reduced while heat-treating an initial tobacco preparation having a water content below 20% w/w, such as within the range of from about 7 to 17% w/w, compared to when heat-treatment is carried out on a tobacco preparation having higher water content, such as 26% w/w.

In addition, softness (resistance to deformation) of the pouched snus products was measured and it was found that the average peak force required to deform a pouched snus product was reduced when the water content of the initial tobacco preparation is below 20% w/w, such as within the range of from about 7 to 17% w/w, compared to when heat-treatment is carried out on an initial tobacco preparation having a higher water content, such as 26% w/w or above.

Example 3

Impact of Water Content of Initial Tobacco Preparation on the Weight Variance of Pouched Smokeless Tobacco Products Packed with a Pouch Packer Machine in Accordance with NYPS Technology Smokeless tobacco compositions suitable for pouch packing using the NYPS technology were made according to GothiaTek® standard containing the following ingredients specified in Table 3.1.

TABLE 3.1

| Ingredients of smokeless tobacco composition | wt % |
|---|---|
| Tobacco flour (containing lamina and stem), dry weight | 37.9 |
| Water content | 52.5 |
| Sodium chloride (NaCl) | 4.2 |
| Propylene glycol | 3.5 |
| Sodium carbonate (Na$_2$CO$_3$) | 1.9 |

The moisture content of the composition given in Table 3.1 is about 56% w/w.

a) Heat Treatment of Initial Tobacco Preparation

First, four initial tobacco preparations containing tobacco flour, sodium chloride and different amounts of water (including moisture contained in the tobacco flour and, where applicable, water added to the tobacco flour) as specified in Table 3.2, were prepared. The initial tobacco preparations contained all the tobacco flour and all the added sodium chloride of the smokeless tobacco compositions as specified in Table 3.1.

The moisture content of the tobacco flour used for preparing the initial tobacco preparations was about 7 weight % (as measured with the herein described method).

TABLE 3.2

| Initial tobacco preparation | Tobacco flour, dry weight (kg) | Added NaCl (kg) | Total water* (kg) | Water content* (weight %) |
|---|---|---|---|---|
| 3-A (comparative) | 18.54 | 2.06 | 13.54 | 40 |
| 3-B (comparative) | 18.54 | 2.06 | 13.54 | 40 |
| 3-C | 18.54 | 2.06 | 1.46 | 7 |
| 3-D | 18.54 | 2.06 | 1.46 | 7 |

*including moisture contained in the tobacco flour and, where applicable, water added to the tobacco flour Each of the initial tobacco preparations was supplied to a ploughshare mixer (Lödige, FM130D) and thereafter heat treated using a combination of jacket heating and injection of steam to control the temperature.

The temperature of comparative tobacco preparations 3-A and 3-B having a water content of 40% w/w was varied between 70° C. and 102° C. during five hours of heat treatment.

The temperature of tobacco preparations 3-C and 3-D having a water content of 7% w/w was held at 70° C. for 75 minutes.

b) Preparation of Smokeless Tobacco Compositions

After the above mentioned 75 minutes of heat treatment of tobacco preparations 3-C and 3-D, water was added to each of these preparations, when still kept at a temperature of about 70° C., to reach a water content of 40% w/w. Thereafter, the temperature was varied between 70° C. and 102° C. for three hours and 45 minutes in the ploughshare mixer.

A portion of each of the tobacco preparations 3-A (comparative) and 3-C was cooled down at room temperature for about 2 hours to reach a temperature of about 20 to 25° C., transferred to a Kenwood Major KM230 mixer (Kenwood Ltd) and the appropriate amounts of water, propylene glycol and sodium carbonate were added to each preparation and blended for 5 minutes to obtain the smokeless tobacco compositions 3-A and 3-C in accordance with Table 3.1.

Appropriate amounts of water, propylene glycol and sodium carbonate were added to each of preparations 3-B (comparative) and 3-D in the ploughshare mixer when the preparations were at a temperature of 70° C. and the blends were thereafter chilled to about 20° C. by flowing cold water in the mixer jacket for about 2 hours to obtain smokeless tobacco compositions 3-B and 3-D in accordance with Table 3.1.

c) Production of Pouched Smokeless Tobacco Products

The tobacco compositions were packed in pouches using a pouch packer machine in accordance with the herein referenced NYPS technology. The target weight per pouched product was 1.0 g.

100 pouched products from each composition were weighed on a Mettler Toledo PB602-S/FACT scale and the relative standard deviation (RSD) was calculated using the following formula:

$$RSD = (\text{Standard Deviation/Average Weight}) \times 100$$

Figure 3:
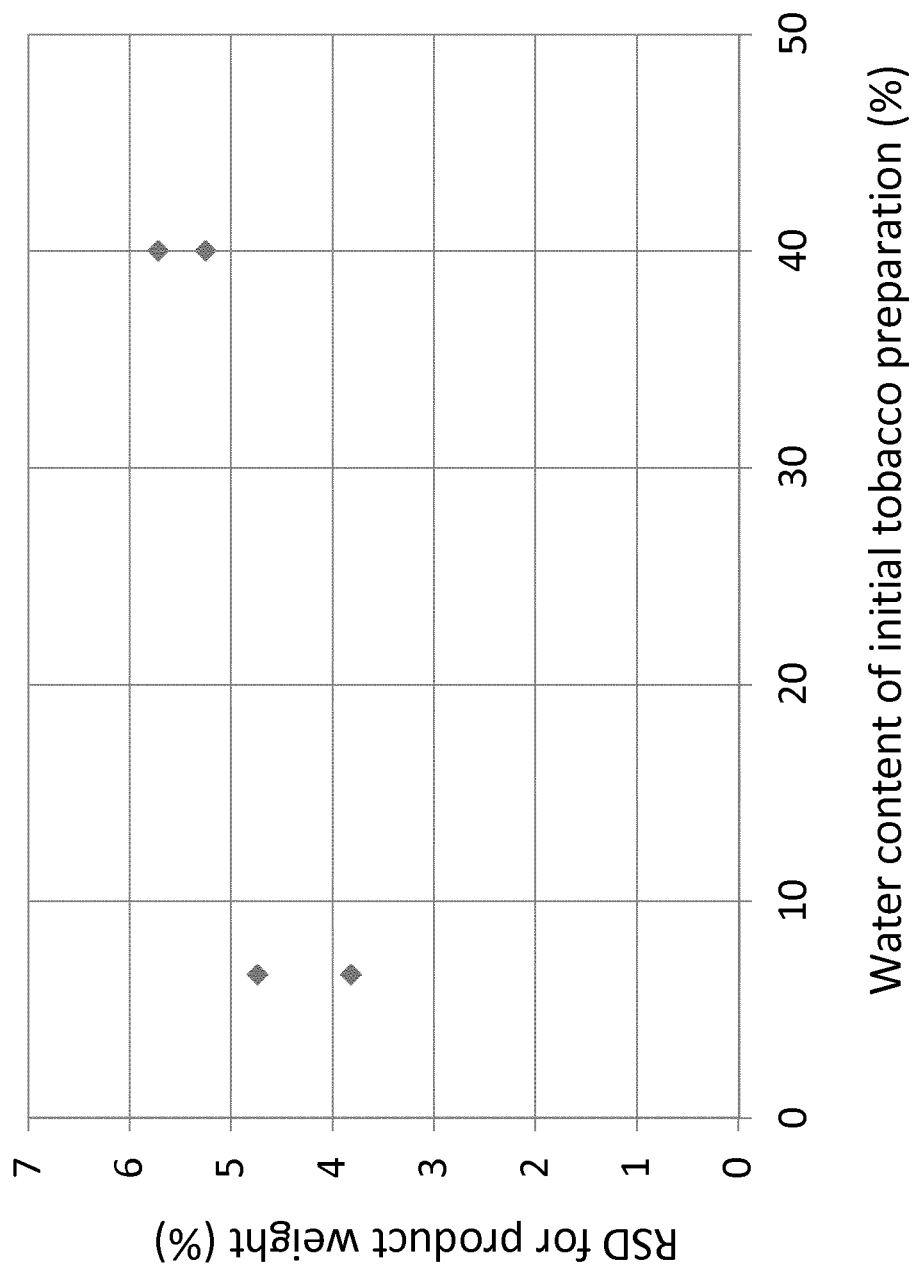
FIG. 3 illustrates the impact of water content of the initial tobacco preparation subjected to heat treatment (for 75 minutes, temperature 70° C.) on weight variance of pouched snus products produced using a pouch packer machine in accordance with the herein referenced NYPS technique.

The results are presented in Table 3.3 and illustrated in FIG. 3.

TABLE 3.3

| Initial tobacco preparation | Water content* of initial tobacco preparation (weight %) | RSD for product weight (%) (NYPS packer) |
|---|---|---|
| 3-A | 40 | 5.3 |
| 3-B | 40 | 5.7 |
| 3-C | 7 | 3.8 |
| 3-D | 7 | 4.7 |

*including moisture contained in the tobacco flour and, where applicable, water added to the tobacco flour The data in Table 3.3 shows that the weight variance of pouched products produced using a pouch packer machine in accordance with the herein referenced NYPS technology is significantly reduced while heat-treating an initial tobacco preparation having a water content below 20% w/w, such as about 7% w/w, compared to when heat-treatment is carried out on a tobacco preparation having a higher water content, such as 40%.

Example 4

Impact of Water Content of Initial Tobacco Preparation on Waste of Pouched Smokeless Tobacco Products Packed with a Pouch Packer Machine in Accordance with NYPS Technology Four types of pouched snus products (herein called Comparative Products 1-4) were produced in large scale, such as about 400-1400 kg products per batch, using a snus composition prepared by heat treating an initial tobacco preparation having a water content of above 20% w/w (see Table 4.3).

Four types of pouched snus products (herein called Test Products 1-4) were produced in large scale, such as about 400-1400 kg products per batch, using the method as disclosed herein.

Smokeless tobacco compositions, suitable for pouch packing using NYPS technology, were made according to GothiaTek® standard containing ingredients as specified in Tables 4.1 and 4.2, respectively. The Comparative Snus Compositions 1-4 were used in the preparation of Comparative Products 1-4 and the Test Snus Compositions were used in the preparation of Test Products 1-4.

TABLE 4.1

| | Comparative Snus Compositions | | | |
|---|---|---|---|---|
| | 1 | 2 | 3 | 4 |
| Water content (wt %) | 44.4 | 48.7 | 48.7 | 44.6 |
| Tobacco flour, dry weight (wt %) | 42.4 (blend A) | 41.6 (blend B) | 41.3 (blend B) | 42.4 (blend A) |
| Added NaCl (wt %) | 4.9 | 3.5 | 3.4 | 4.9 |
| Propylene glycol | 3.4 | 3.3 | 3.1 | 3.3 |
| $Na_2CO_3$ (wt %) | 2.8 | 2.5 | 2.5 | 2.8 |
| Bamboo fibers (wt %), dry weight | 1.8 | — | — | 1.8 |
| Flavours (wt %) | 0.3 | 0.2 | 0.7 | 0.3 |
| Acesulfame K (wt %) | — | — | 0.2 | — |

The moisture content of the compositions given in Table 4.1 is within the range of from about 48% w/w to about 53% w/w.

TABLE 4.2

| | Test Snus Compositions | | | |
|---|---|---|---|---|
| | 1 | 2 | 3 | 4 |
| Water content (wt %) | 44.3 | 48.7 | 48.6 | 44.2 |
| Tobacco flour, dry weight (wt %) | 43.6 (blend A) | 41.9 (blend B) | 41.5 (blend B) | 43.5 (blend A) |
| Added NaCl (wt %) | 3.9 | 3.5 | 3.4 | 3.9 |
| Propylene glycol | 3.5 | 3.4 | 3.1 | 3.5 |
| $Na_2CO_3$ (wt %) | 2.6 | 2.3 | 2.3 | 2.6 |
| Bamboo fibers (wt %) | 1.9 | — | — | 1.9 |
| Flavours (wt %) | 0.3 | 0.2 | 0.7 | 0.5 |
| Acesulfame K (wt %) | — | — | 0.2 | — |

The moisture content of the compositions given in Table 4.2 is within the range of from about 48% w/w to about 52% w/w.

a) Heat-Treatment of Initial Tobacco Preparations

First, initial tobacco preparations containing tobacco flour, added sodium chloride and bamboo fibers (Vitacel® Bamboo Fiber BAF 400 DV supplied by J. rettenmaier & Sohne GmbH) and having water content (including moisture contained in the tobacco flour, moisture contained in the bamboo fibers, and, where applicable, water added to the tobacco flour) as specified in Tables 4.3 were prepared. The initial tobacco preparations contained all the tobacco flour, all the added sodium chloride and all the bamboo fibers of the smokeless tobacco compositions as specified in Tables 4.1 and 4.2.

TABLE 4.3

| Product | Water content* of initial tobacco preparation (weight %) |
|---|---|
| Comparative Product 1 | 26 |
| Comparative Product 2 | 31 |
| Comparative Product 3 | 32 |
| Comparative Product 4 | 26 |
| Test Product 1 | 8.1 |
| Test Product 2 | 8.2 |
| Test Product 3 | 8.3 |
| Test Product 4 | 8.1 |

*including moisture contained in the tobacco flour, moisture contained in the bamboo fibers and, where applicable, water added to the tobacco flour Each of the initial tobacco preparations was supplied to a ploughshare mixer (Lödige FKM 4200 D) and heat treated for 10.5 hours using a combination of jacket heating and injection of steam to control the temperature. The temperature was varied between 75° C. and 102° C. All the initial tobacco preparations were subjected to the same treatment process.

b) Preparation of Smokeless Tobacco Compositions

The appropriate amounts of water, propylene glycol, flavour and sodium carbonate were added to each of the initial tobacco preparations in the ploughshare mixer when the preparations were at a temperature of about 75° C. Acesulfame K was added to some of the initial tobacco preparations as specified in Tables 4.1 and 4.2. Each of the resulting preparations was thereafter further heat treated for 1 hour at 75° C. and then chilled to about 20° C. by flowing cold water in the mixer jacket for about 2.5 hours to obtain the smokeless tobacco compositions as specified in Tables 4.1 and 4.2.

c) Production of Pouched Smokeless Tobacco Products

The final snus compositions were packed in pouches using NYPS technology thereby providing pouched snus products (Comparative Products 1-4 and Test Products 1-4). The target weight per pouched product was 0.9 g (including pouch material).

The amount of disqualified pouched snus products was monitored as described below.

Firstly, pouched products having heat seals contaminated with snus were disqualified and defined as waste.

The pouched snus products were then put in cans and weighed. 24 pouched snus products were put in each can. Thus, the target weight of pouched products in each can was 21.6 g. The weight variance limits were set to the range of from 19.7 to 25.4 g. Cans containing 24 pouched snus products and having a weight outside of this range was disqualified and defined as waste.

The total waste was defined as the sum of the above mentioned two groups.

Figure 4:
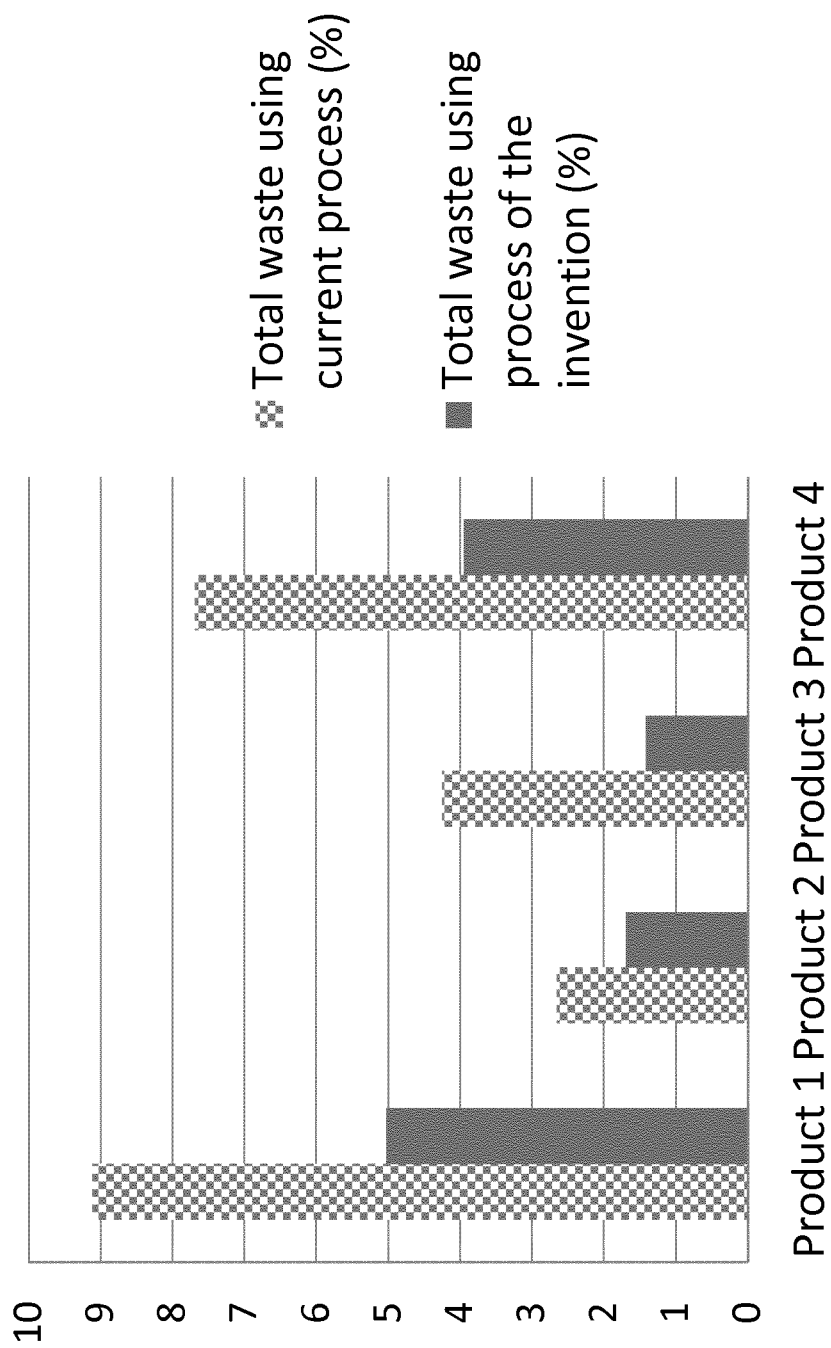
FIG. 4 illustrates the impact of water content of the initial tobacco preparation subjected to heat treatment on waste in production of pouched snus products using a pouch packer machine in accordance with the herein referenced NYPS technique.

The results are shown in Table 4.4 and illustrated in FIG. 4.

In FIG. 4, "Product 1" indicates the results for both Comparative Product 1 and Test Product 1; "Product 2" indicates the results for both Comparative Product 2 and Test Product 2; "Product 3" indicates the results for both Comparative Product 3 and Test Product 3; and "Product 4" indicates the results for both Comparative Product 4 and Test Product 4.

TABLE 4.4

| | Total waste (%) | | Total waste (%) |
|---|---|---|---|
| Comparative Product 1 | 9.12 | Test Product 1 | 5.03 |
| Comparative Product 2 | 2.67 | Test Product 2 | 1.70 |
| Comparative Product 3 | 4.25 | Test Product 3 | 1.42 |
| Comparative Product 4 | 7.70 | Test Product 4 | 3.95 |

Table 4.4 shows that when the initial tobacco preparation subjected to heat treatment has a water content of about 8 wt %, the total waste during packaging of the resulting snus composition in pouches is significantly reduced in comparison to the total waste during packaging in pouches of a corresponding snus composition prepared by heat-treating an initial tobacco preparation having a higher water content, such as about 26% w/w or higher.

Example 5

Impact of Water Content of Initial Tobacco Preparation on Softness of Pouched Snus Products Packed with a Pouch Packer Machine in Accordance with NYPS Technology Softness of pouched snus products produced in large scale was assessed by a trained sensory panel.

One type of pouched snus product (herein called Comparative Product 5) was produced in large scale, such as about 400-1400 kg products per batch, using a snus composition prepared by heat treating an initial tobacco preparation having a water content of above 20% w/w (see Table 5.2).

One type of pouched snus products (herein called Test Product 5) was produced in large scale, such as about 400-1400 kg products per batch, using the method as disclosed herein (see Table 5.2).

Snus compositions, suitable for pouch packing using NYPS technology, were made according to GothiaTek® standard containing ingredients as specified in Table 5.1. Comparative snus composition 5-A (prepared from initial tobacco preparation 5-A) was used in the preparation of Comparative Product 5 and Test snus composition 5-B (prepared from initial tobacco preparation 5-B) was used in the preparation of Test Product 5.

TABLE 5.1

| | Ingredients of smokeless tobacco composition | |
|---|---|---|
| | 5-A (comparative) | 5-B |
| Water content (wt %) | 44.4 | 44.3 |
| Tobacco flour, dry weight (wt %) | 42.4 (blend A) | 43.6 (blend A) |
| Added NaCl (wt %) | 4.9 | 3.9 |
| Propylene glycol | 3.4 | 3.5 |
| $Na_2CO_3$ (wt %) | 2.8 | 2.6 |
| Bamboo fibers, dry weight (wt %) | 1.8 | 1.9 |
| Flavours (wt %) | 0.3 | 0.3 |

The moisture content of the compositions given in Table 5.1 is about 48%.

a) Heat-Treatment of Initial Tobacco Preparations

First, initial tobacco preparations containing tobacco flour, added sodium chloride and bamboo fibers (Vitacel® Bamboo Fiber BAF 400 DV supplied by J. rettenmaier & Sohne GmbH) and having water content (including moisture contained in the tobacco flour, moisture contained in the bamboo fibers, and, where applicable, water added to the tobacco flour) as specified in Table 5.2 were prepared. The initial tobacco preparations 5-A and 5-B contained all the tobacco flour, all the added sodium chloride and all the bamboo fibers of the smokeless tobacco compositions as specified in Table 5.1.

TABLE 5.2

| Product | Water content* of initial tobacco preparation (weight %) |
|---|---|
| Comparative Product 5 | 26.2 |
| Test Product 5 | 8.1 |

*including moisture contained in the tobacco flour, moisture contained in the bamboo fibers and, where applicable, water added to the tobacco flour Each of the initial tobacco preparations was supplied to a ploughshare mixer (Lödige FKM 4200 D) and heat treated for 10.5 hours using a combination of jacket heating and injection of steam to control the temperature. The temperature was varied between 75° C. and 102° C. All the initial tobacco preparations were subjected to the same treatment process.

b) Preparation of Smokeless Tobacco Compositions

The appropriate amounts of water, propylene glycol, flavour and sodium carbonate were added to each of the initial tobacco preparations in the ploughshare mixer when the preparations were at a temperature of about 75° C. Each of the resulting preparations was thereafter further heat treated for 1 hour at 75° C. and then chilled to about 20° C. by flowing cold water in the mixer jacket for about 2.5 hours to obtain the smokeless tobacco compositions as specified in Table 5.1.

c) Production of Pouched Smokeless Tobacco Products

The final snus compositions were packed in pouches using NYPS technology thereby providing pouched snus products (Comparative Product 5 and Test Product 5). The target weight per pouched product was 0.9 g (including pouch material).

After one week of storage in a refrigerator (temperature of about 6±2° C.), the pouched snus products (Comparative Product 5 and Test Product 5) were presented to a trained sensory panel (n=13) in two paired comparison tests with separate blind-coded samples for finger softness and oral softness, respectively. The panel was asked to compare the softness of the two products i) using only their fingers (finger softness), and ii) orally; by placing the pouches between their upper lip and gum (oral softness). The panel then assessed which of the two products they perceived as the softest.

The results are shown in Table 5.4.

TABLE 5.4

| | Number of panel participants who perceived Test Product 5 as softer | Number of panel participants who perceived no difference | Number of panel participants who perceived Comp. Product 5 as softer |
|---|---|---|---|
| Finger softness | 13 | 0 | 0 |
| Oral softness | 11 | 1 | 1 |

Table 5.4 shows that when the initial tobacco preparation (5-B) subjected to heat treatment has a water content of about 8 wt %, the perceived softness (both finger softness and oral softness) of the pouched snus product (Test Product 5) is significantly increased in comparison to the pouched product (Comparative Product 5) of a corresponding snus composition prepared by heat-treating an initial tobacco preparation (5-A) having a higher water content, such as about 26% w/w or higher.

The invention claimed is:

1. A method for producing pouched smokeless tobacco products for oral use, said method comprising:
    providing an initial tobacco preparation comprising divided tobacco material, said initial tobacco preparation having a water content of at most 15% w/w;
    heating the initial tobacco preparation to a temperature range of from 80° C. to 170° C. for a time period of from 30 minutes to 72 hours to provide a heat-treated tobacco preparation, said heating being the first heating step of the initial tobacco preparation;
    providing a smokeless tobacco composition comprising said heat-treated tobacco preparation; and
    enclosing portions of said smokeless tobacco composition in saliva-permeable pouch material thereby providing pouched smokeless tobacco products.

2. The method according to claim 1, wherein the water content of the initial tobacco preparation is from 3 to 15% w/w.

3. The method according to claim 2, wherein the initial tobacco preparation comprises divided tobacco material having a water content of from 3 to 15% w/w.

4. The method according to claim 1, wherein the initial tobacco preparation comprises divided tobacco material having a water content of from 3 to 15% w/w and one or more ingredients selected from the group consisting of water, salt and non-tobacco plant fibers.

5. The method according to claim 1, further comprising adding water, in one or more steps to the heat-treated tobacco preparation.

6. The method according to claim 1, wherein the moisture content of the smokeless tobacco composition is from 1 to 70% w/w.

7. The method according to claim 1, further comprising loading the initial tobacco preparation into a vessel and heating the initial tobacco preparation by a method selected from the group consisting of steam injection, jacket heating, hot gas injection, microwave treatment, heating chamber and any combinations thereof.

8. The method according to claim 1, wherein the temperature range is from 80° C. to 150° C.

9. The method according to claim 1, wherein the time period is from 30 minutes to 24 hours.

10. The method according to claim 1, further comprising loading the initial tobacco preparation into a vessel and heating the initial tobacco preparation by steam injection.

11. The method according to claim 1, wherein the temperature range is from 95° C. to 170° C. for at least 10 minutes of the time period.

12. The method according to claim 1, further comprising compressing each of said portions of said smokeless tobacco composition prior to enclosing said portions in the saliva-permeable pouch material.

* * * * *